(12) United States Patent
Ebbeskotte et al.

(10) Patent No.: US 7,600,818 B2
(45) Date of Patent: Oct. 13, 2009

(54) FASTENING DEVICE FOR THE HEADREST OF A VEHICLE SEAT

(75) Inventors: Ulrich Ebbeskotte, Neuhengstett (DE); Dieter Kraft, Langenaltheim (DE)

(73) Assignee: Alfmeier Prazision Ag Baugruppen und Systemlosung, Treuchtlingen (DE)

( * ) Notice: Subject to any disclaimer, the term of this patent is extended or adjusted under 35 U.S.C. 154(b) by 39 days.

(21) Appl. No.: 10/528,958

(22) PCT Filed: Jul. 27, 2004

(86) PCT No.: PCT/EP2004/000129

§ 371 (c)(1),
(2), (4) Date: Jan. 17, 2006

(87) PCT Pub. No.: WO2004/062963

PCT Pub. Date: Jul. 29, 2004

(65) Prior Publication Data

US 2006/0163929 A1    Jul. 27, 2006

(30) Foreign Application Priority Data

Jan. 10, 2003  (DE) ................. 103 00 832

(51) Int. Cl.
*A47C 1/10* (2006.01)
(52) U.S. Cl. .......... 297/408; 297/410; 297/391
(58) Field of Classification Search ......... 297/391, 297/408, 410
See application file for complete search history.

(56) References Cited

U.S. PATENT DOCUMENTS

| 3,186,763 A | 6/1965 | Ferrara |
| 3,603,642 A | 9/1971 | Laessker |
| 4,111,483 A | 9/1978 | Jaeger |
| 4,111,484 A | 9/1978 | Jaeger |
| 4,128,274 A | 12/1978 | Schmedemann |

(Continued)

FOREIGN PATENT DOCUMENTS

DE           3545142         6/1987

(Continued)

OTHER PUBLICATIONS

International Search Report of PCT/EP04/000129, dated May 17, 2004.

(Continued)

*Primary Examiner*—David Dunn
*Assistant Examiner*—Erika Garrett
(74) *Attorney, Agent, or Firm*—Dority & Manning, P.A.

(57) ABSTRACT

The invention relates to a fastening device for the headrest of a vehicle seat, comprising two fixtures which are spaced apart in the transversal direction (Y) of the seat and guide two rods (6, 7) that support the headrest so as to be able to adjust the height thereof. Said fastening device encompasses a fixture comprising a first guiding sleeve (23) that receives and slidingly directs a support rod (7), and a support (24) which is guided on the frame (2) of the vehicle seat so as to be movable in the transversal direction (Y) of the seat, and on which guiding sleeve (23) is mounted so as to be pivotable about a first swivel pin (27) extending in the longitudinal direction of the seat (X).

14 Claims, 8 Drawing Sheets

U.S. PATENT DOCUMENTS

| | | | |
|---|---|---|---|
| 4,545,618 A * | 10/1985 | Kitamura | 297/410 |
| 4,600,240 A | 7/1986 | Suman et al. | |
| 4,639,041 A | 1/1987 | Furukawa | |
| 4,678,232 A | 7/1987 | Ishida et al. | |
| 5,108,150 A | 4/1992 | Stas et al. | |
| 5,110,185 A * | 5/1992 | Schmutz et al. | 297/410 |
| 5,397,170 A | 3/1995 | Shrock | |
| 5,474,358 A | 12/1995 | Maeyaert | |
| 5,484,189 A * | 1/1996 | Patterson | 297/410 |
| 5,590,933 A | 1/1997 | Andersson | |
| 5,651,584 A | 7/1997 | Chenot et al. | |
| 5,775,777 A | 7/1998 | Delling | |
| 5,860,703 A * | 1/1999 | Courtois et al. | 297/410 |
| 5,927,813 A * | 7/1999 | Nemoto | 297/391 |
| 6,022,078 A | 2/2000 | Chang | |
| 6,074,011 A | 6/2000 | Ptak et al. | |
| 6,099,077 A * | 8/2000 | Isaacson | 297/410 |
| 6,152,531 A | 11/2000 | Deceuninck | |
| 6,508,512 B2 * | 1/2003 | Saberan et al. | 297/408 |
| 6,612,653 B2 | 9/2003 | Takata | |
| 6,619,739 B2 | 9/2003 | McMillen | |
| 6,666,516 B2 | 12/2003 | Grammss et al. | |
| 6,736,461 B2 | 5/2004 | Blair et al. | |
| 6,796,613 B2 * | 9/2004 | Klink et al. | 297/410 |
| 6,805,411 B2 | 10/2004 | Gramss et al. | |
| 6,824,214 B2 | 11/2004 | McMillen | |
| 6,942,293 B2 | 9/2005 | Kluehspies | |
| 7,165,814 B2 | 1/2007 | Gans et al. | |
| 7,284,793 B2 | 10/2007 | Kluehspies et al. | |
| 2003/0111885 A1 | 6/2003 | McMillen | |
| 2003/0151290 A1 | 8/2003 | Gans et al. | |
| 2005/0023878 A1 | 2/2005 | Kluehspies | |
| 2005/0218708 A1 | 10/2005 | Gramss | |
| 2005/0225144 A1 | 10/2005 | Kluhspies et al. | |
| 2006/0119163 A1 | 6/2006 | Gans et al. | |
| 2006/0163928 A1 | 7/2006 | Droche | |
| 2006/0163929 A1 | 7/2006 | Ebbeskotte et al. | |

FOREIGN PATENT DOCUMENTS

| | | |
|---|---|---|
| DE | 19532260 | 3/1997 |
| DE | 29809175 | 10/1998 |
| DE | 19853624 | 5/2000 |
| DE | 102004038707 | 4/2005 |
| DE | 102004007325 | 9/2005 |
| EP | 0829390 | 3/1998 |
| EP | 0976608 | 2/2000 |
| EP | 0990555 | 4/2000 |
| EP | 1277612 | 1/2003 |
| EP | 1502809 | 2/2005 |
| EP | 1582400 | 2/2005 |
| EP | 1686004 | 8/2006 |
| EP | 1752334 | 2/2007 |

OTHER PUBLICATIONS

Patent Abstracts of Japan Publication No. 57144135, Publication Date Jun. 1982.
Abstract of DE 3545142, published Jun. 25, 1987.
Abstract of DE 19532260, published Mar. 6, 1997.
Abstract of DE 19853624, published May 25, 2000.
Abstract of DE 102004038707, published Apr. 28, 2005.
Abstract of DE 102004007325, published Sep. 1, 2005.
Abstract of EP 1277612, published Jan. 22, 2003.

* cited by examiner

FASTENING DEVICE FOR THE HEADREST OF A VEHICLE SEAT

FIELD

The invention concerns a fastening device for a headrest of a vehicle seat, which possesses two holders, which are distanced from one another in a direction transverse to the seat. The purpose of the said holders is to enable adjustment of the elevation of two rods, which support the said headrest. The holders are so designed, that they positionally affix the rods, which are, as a rule, extensions of the arms of a headrest yoke. The said extensions are thus securely positioned with minimum clearance principally in the longitudinal direction of the seat (X-direction) but alternatively, transverse thereto, namely, in the Y-direction. In order to assure precision of height adjustment, the holders possess circumferentially enclosing, guide-casings (hereinafter referred to as "shells") about the rods. To achieve a desired setting of the headrest at different heights, one of the two rods is serrated, into a selected notch of which, a spring loaded latch engages.

BACKGROUND

Whether the force for the supported height adjustment is due to a motor, a spring, gravity or is generated manually, it is desirable, that the rods of the headrests can be vertically moved in their holders in the Z-direction without an application of excessive effort. This requires an exactly parallel alignment of the said rods and their shells within the planes YZ and YX and calls for a predetermined separating distance of the rods and shells. Due to manufacturing procedures, it cannot entirely be avoided, that the rods and their shells deviate from ideal alignment, which engenders a situation wherein the effort necessary for vertical movement of the headrest becomes greater. This causes a manual height adjustment to be more difficult and leads to difficulties for automatic operation.

SUMMARY

With this background, it is the purpose of this present invention to propose a fastening device for a headrest, which even in the above named cases, enables an easy adjustment of headrest height.

This purpose is achieved by a fastening device in accord with claim 1. Therein is taught, that a holder is provided, wherein a rod is slidingly encased within a guiding shell, and wherein the shell is pivotally supported by a carrier affixed to a seat frame structure, which shell is movable in the Y direction and rotates about a first axis, which runs in an X-direction. In the case of holders, with rigidly affixed guides on the framing of the seat, difficulties can arise in height adjustments. These difficulties encompass deviations in the separating distance of the rods, which otherwise should be aligned exactly parallel within the planes XZ and YZ. Because of the mobility of the shells in the Y-direction, either of these could match its Y-position to a possibly inexact position of a currently misaligned rod. Thereby, inner stress and related increases of force therefrom for height adjustment effort can be avoided.

Advantageously, the shell is pivotally supported about an axis which extends itself in the longitudinal direction of the seat, i.e., in the X-direction. In the case of a tilting of the rods in the XZ-plane, it is possible, that the shell surrounding the rod can now assume an inclined posture matching that of the inclined position of the rod. A capability for movement of the rod in the X-direction is, in this case, not necessary.

A possible movement component acting in the X-direction would lead, obviously, to a slightly pivoting motion of the second headrest rod. Simultaneously, the second headrest rod would serve as a pivotal axis and would thus permit a very small and, on this account, a tolerable inclination of the headrest in the Y-direction. An offset of the rods in the XZ-plane, however, can be compensated for, if a capability for movement in the Y-direction is provided in the second holder. This capability can be achieved if a holder is available, which can rotate about an axis running in the Y-direction. In general, it is also possible that the capability for compensation in the YZ-plane and in the XZ-plane may be apportioned between the two holders of a fastening device.

The movability of a carrier in the Y-direction, could, for example, be carried out, if it is slidingly guided on a connector situated on the seat framing, which connector extends itself in the Y-direction. During a height adjustment of a headrest, with rods inclined to one another in the XZ-plane, this guiding connector is subjected to a force acting in the longitudinal direction of the rods. This would create a situation, wherein the friction is increased between the guiding shell and the bar, slidability in the Y-direction made more difficult, and finally the adjusting effort in the Z direction becomes greater. In the case of an additional, advantageous embodiment variant, provision has been made, that the carrier, running in the X-direction and located on the seat frame, is pivotally supported about a third axis, which, with a separating distance in the Z-direction from the first axis, is advantageously situated underneath this axis and parallel thereto. By means of this formation, should a width deviation occur and/or a failure of exact parallelism of the rods come about, the required frictional force for a Y-direction sliding displacement of the carrier is essentially less than in the case of the above described sliding movement, which allows an easier adjustability of the head rest in the Z-direction.

A tipping rotation of the carrier is assured in an advantageous, variant embodiment, wherein the carrier is movably guided in the Y-direction in a space to be found above the third axis. In order that a wobble-free and secure holding in the X-direction of the headrest may be assured, the carrier in the said direction is affixed to the seat framing. In a preferred embodiment, the third pivotal axis, about which the carrier on the seat framing is swingably mounted, is formed by an advantageous design, wherein two seat framing projections are available, which lie opposite to one another in the X-direction and upon which the carrier is supported.

In a particularly advantageous embodiment, the shell is furnished with a projecting ring having a spherical projection, which linkedly engages itself into a complementarily spherical recess in the carrier. In this arrangement, the surface of the ring projection and the spherical receptor surface, which coact with each other, create a center point which is also the intersecting point of the first and the second axes. The shell and the carrier are thus bound together as a spherical universal joint. The shell, on this account, can be pivoted both about the first and the second axis. A further advantage of the said linked connection is to be found therein, in that the shell is completely encapsulated by the carrier. Thereby zero clearances and a reliable holder of the shell are assured, which, however, allows a light inclination of the shell and a large surface, which is ideal for the introduction of force caused by a collision.

In the case of another advantageous embodiment, the rigidity of the connection between the shell and the carrier is additionally improved in that the shell is anchored on a flange, which projects from the outer side of the shell to match with a second flange on the upper end of the carrier. In this way the mentioned universal joint is relieved of stress by the insertion of a headrest rod. Thus assurance is given, even if because of an extreme degree of tilting of a rod, considerable forces act in its longitudinal direction against the shell, nevertheless, this easily tilts in the direction of the carrier. The flange serves also as a detent, which, during assembly, limits the depth of insertion of the guide shell up to an axial position, wherein the projection finds itself at the same height as its coacting recess. A smooth coaction of the said surfaces and sufficient support functioning in each pivoted position of the guide shell are assured, since the contacting surfaces, of the flange and the rod are complementary, partially spherical, the center point of which, as said, is also the intersection point of the first and second axes.

Advantageously, the carrier is a hollow member, which is penetrated by the shell. This arrangement is especially of advantage, if the seat framing includes a protective encasement into which the said hollow member can be inserted with ample circumferential play. Because of the fact, that the carrier is encapsulated by the said protective encasement, the infiltration of foreign bodies into the holder is prevented and at the same time, the freedom of movement of the shell and the carrier is reduced. In order to enable the capability of movement for the shell and the carrier, that is to say, their pivotal freedom, appropriate, predetermined spaces are necessary, which are located first between the shell and the carrier, and second, between the carrier and the said protective encasement A preferred embodiment provides, that the walls of the carrier, which face in the Y-direction diverge from one another toward their lower end. Thereby, in a space saving manner, within the carrier, a pivoting zone has been created for the shell. Simultaneously, this divergence limits the free zone required for the swinging of the carrier, because the carrier tapers with its increasing distance from its pivoting axis, whereby, in the same direction, an increase of swing for the carrier is specifically limited.

Advantageously, the shell is rotationally fixed in respect to turning on its central axis. Thereby, it becomes possible to place, with a preselected rotational setting, on the upper end of said shell, a provided structure, namely a cover plate. This preselected rotational setting is determined by the oppositely diametric locations of projections on a radially raised ring about the shell which aforesaid projections are made as radially protruding detents, which engage in complementary recesses in the carrier, which recesses extend in the X, Y, and Z directions. The said recesses are designed in the shape of slots and exist in those walls of the carrier which face in the Y-direction. Further, the said slots extend themselves upward from that area of the carrier wherein a complementary receiver cavity has been excised to form the said universal joint and the said slots terminate in the upper end face of the carrier. The slots serve, in this design, not only for the blocking of rotation, but also to achieve a simplification of the assembly, thus performing a double function.

BRIEF DESCRIPTION OF THE DRAWINGS

The invention, in the following, will be more closely described and explained, with the aid of the attached drawings and in regard to an presented embodiment. There is shown in.

DETAILED DESCRIPTION OF THE DRAWINGS

Figure 1:
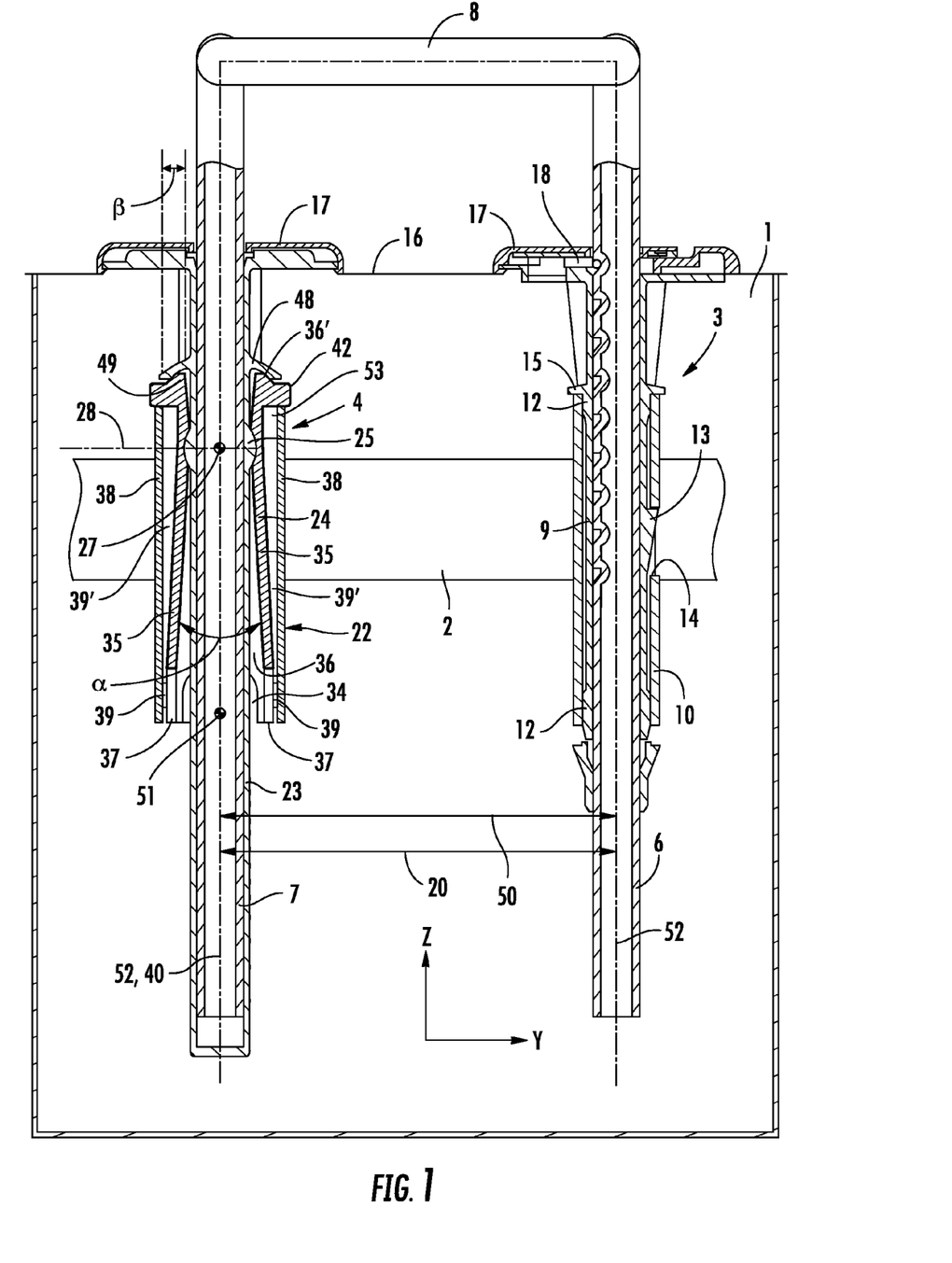
FIG. 1 a sectional presentation of the upper area of an inclined back of a seat of a vehicle with holders an a headrest yoke inserted therein, FIG. 2 a perspective view, with inner exposure, of a holder, and in FIG. 3 to FIG. 9 are illustrations in accord with FIG. 1, from which the method of operation of a head rest support may be inferred.

In FIG. 1 the upper part of an inclined back of a vehicle seat 1 is presented. On the interior framing 2 thereof, are shown two holders 3 and 4 for a headrest which are distanced from one another and which are affixed transverse to the seat, that is, lie in the Y-direction. For the reason of simplifying the drawing, instead of the headrest itself, respectively, only its carrying structure, namely a headrest yoke 5 is shown. This yoke 5 encompasses two parallel support rods, 6 and 7 which are placed in the said holders 3 and 4 at the level of the seat and extend themselves upward in the Z direction. On the upper part thereof, the rods 6 and 7 join together in a yoke shaped part 8. It is naturally possible to consider, alternately, support rods which are not bound together.

The holder 3 includes a guiding shell 9 (hereinafter "shell") which circumferentially encases the rod 6 and which shell 9 itself is in turn encased within a protective encasement 10, which said encasement is affixed to the seat framing 2. The diameter of at least two fixed end longitudinal sections 12 of the shell 9 is so selected, that each shell 9 can be inserted into a protective encasement 10 without play, or at least, with minimal play. The fixation of the shell 9 in the axial direction is effected by a projection 13, which protrudes into a window 14 of the said protective encasement 10. The shell 9 supports itself additionally, by means of a flange 15, which extends itself from the outer peripheral surface of the said shell over the upper end-face of the protective encasement 10. On the upper end of the shell 9, which projects out of the top 16 of the seat back, is provided a cover plate 17. Under this cover plate 17 is placed a restraining mechanism, which employs a spring loaded, holding element 18 which locks the headrest part 8, i.e. the yoke 5, into a selected notch 19 of the rod 6.

The second holding apparatus 4 is so constructed, that it can enclose the rod 7 therewithin, without internal stress, even when the clearances and/or the degree of being parallel of the rods 6, 7 vary from designed specifications. The holder 4, essentially comprises an assembly of a seat frame 2 attached, protective encasement 22, a shell 23 and a carrier 24. The carrier 24, when seen in cross-section is shown to be somewhat square or rectangular in shape, and lies within the said protective encasement 22, which, appropriately sized, has the same right angled cross-section. That part of the longitudinal section of the shell 23, which is encapsulated by the carrier 24, possesses, extending from its outer circumference, a radially projecting ring 25, the outer surface of which is a spherical sector. The ring projection 25 extends itself in a shape-locking manner into a complementary, molded recess 26, and is near to the upper end of the carrier 24. This ring projection 25, in combination with the recess 26 form a spherical universal joint This enables the shell 23 to pivot about a first axis 27 running the X-direction and about a second axis 28 extending in the Y-direction.

Figure 2:
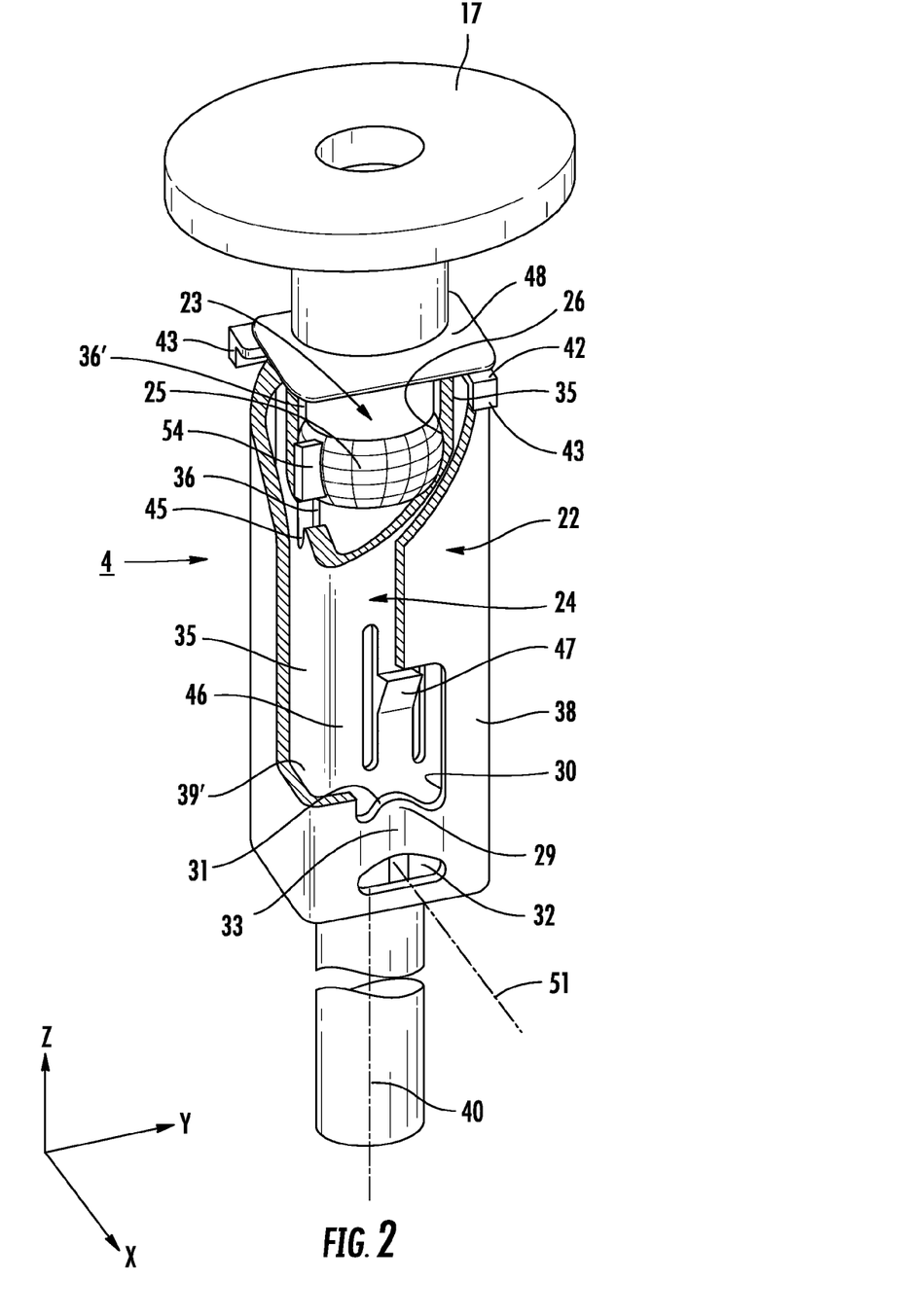

The carrier 24 supports itself at its lower end on two projections 29, which are situated diametrically opposed to one another in the X-direction (see FIG. 2). The said projections are placed on the lower end of the protective encasement 22 and extend themselves inward. These are formed, respectively, from the lower edge 31 of a window 30, which opens in the wall of the carrier 24. Underneath the said projection 29 is another window 32. Located between the windows 30, 32, a web 33 bends inward. The upper edge of the web 33, that is to say, the under edge 31 of the window 30 possesses a convex, upward extending contour. In the undermost section of the carrier 24 and in the X-direction, are two diametrically, oppositely situated recesses 34, the bottom edges of which have a bow-shaped contour and which encapsulates the projections 29 in a partially circumferential manner. By means of the described arrangement, the carrier 24 is pivotally borne on the protective encasement 22, so that it can pivot about a third axis 51 which runs in the X-direction.

In order to permit the capability of the shell 23 to pivot freely about the first axis 27 within the carrier 24, a vertical space 36, 36' is made available between the longitudinal section of the shell 23, which runs above and below the ring projection 25, and the walls 35 of the carrier 24, which face outward in the Y-direction. As can be seen, from the standpoint of the YZ-plane, this said space 36, 36' widens as the distance downward from the ring projection 25 increases. In regard to the longitudinal section, which extends itself downward from the ring projection 25, this is achieved, in that the wall 35 at the lower end of the carrier diverges in such a manner that it opens an angle α, which defines the pivot zone of the shell 23. The continually widening space 36' allows that the inner wall of the associated carrier section, which has a round cross-section, likewise continually expands from the ring projection 25 downward in a conical manner. At the lower end of the inclined, longitudinal section of the wall 35, which runs at the said conical angle, the said wall 35 merges into an enclosing section 37, which exhibits walls which run parallel to one another. Between these said wall sections 37 and those walls 38 of the protective encasement 22, which taper in the Y-direction, in those areas positionally related to section 37, a very fine opening 39 is provided, to enable a free swinging of the carrier 24 in reference to a third axis 51. Between, first, the inclined, longitudinal sections of the wall 35, which peripherally join the wall section 37 and, second, the walls 38 of the protective encasement 22, is to be found another opening 39', which because of the inclined state of the wall 35 continually enlarges itself upward. The walls 38 form, with the walls 35 of the carrier 24, an acute angle, opening upward, which is designated as "angle β", which represents the half of the swinging arc of the carrier 24 about the third axis 51.

On the upper end of the carrier 24 is a molded-on flange 42, which is set transverse to the central axis 40 of the said carrier 24. This flange 42 has a peripheral profile approximating that of the protective encasement 22. The dimensioning thereof is such, that it extends itself on all sides beyond the protective encasement 22. In this manner, the infiltration of foreign bodies into the protective encasement 22 is prevented and a swinging displacement of the carrier 24 is thereby repressed.

Figure 7:
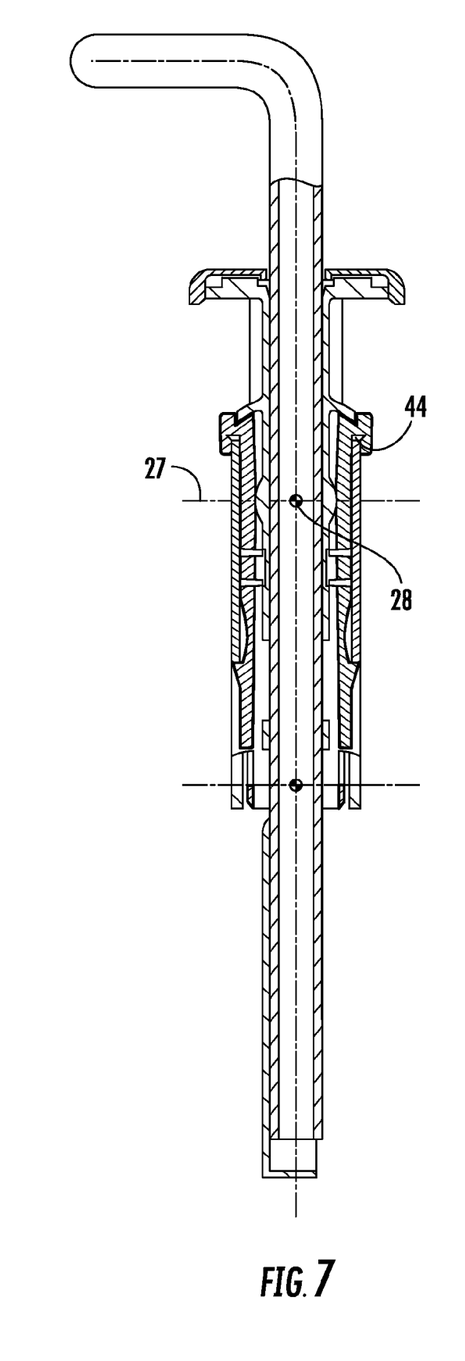

The rims 43 of the flange 42, which extend themselves oppositely in the X-direction, are peripherally bent downward in the Z-direction and thus overlap the upper end area of the protective encasement 22 (see FIG. 2). Between the underside of the flange 42 and the end-face of the of protective encasement 22 is also to be found a fissurelike opening 44 (see FIGS. 7, 8). This opening 44 assures, that the carrier 24 can be pivoted about the third axis 51, without the danger of the underside of the flange interfering with the upper end-face of the protective encasement 22. The upper end area of the carrier 24 respectively possesses in those walls 38, which face in the Y-direction, a slot 45, which slot is centrally located in reference to the widths of the said walls. This said slot 45 extends itself axially from an area located underneath a recess 26. This recess 26 coacts with the ring projection 25. The slot 45 opens into the upper end part of the carrier 24. In the flange 42 is likewise provided, a slot 45' whereby this is partitioned into two parts. By means of the slots 45, 45', the entire upper end zone of the carrier 24 is split into two halves. During assembly, the shell 23 is inserted into the carrier 24. Since the interior of the shell 23, which attaches itself upward to the recess 26, possesses a lesser diameter than the ring projection 25, this area must be widened, which widening is assured by the said slots 45, 45'. The free width of the shell 23 in the area of the recess 26 is so selected, that the spherical surface of the recess 26 lies with some force against the surface of the ring projection 25. As soon as the carrier 24 is inserted into the protective encasement 22, then, the axial fixation of the shell 23 onto the carrier 24 cannot be released, since the protective encasement 22 prevents any widening of the upper end zone of the carrier 24. The axial fixation of the carrier 24 on the protective encasement 22 is done, in each case, by a projection 47, which is located on those walls 46 facing the X-direction, These projections 47 hook under the upper edge of the window 30.

For the relief of the spherical universal joint formed by the combination of the ring projection 25 and the recess 26 upon the insertion of rod 7, an integral flange 48 is integrally connected on the outer circumference of the shell 23. The surface, which lies on the underside of the flange 48 is a sector of a spherical surface, which coacts in combination with a complementary dome 49 on the upper side of the flange 42. The spherical surfaces of the dome 49 and the underside of the flange 48 form a spherical linkage, the center of which is the intersection point of the first and second axes 27, 28. The flange 48 serves also as a detent for the limitation of the depth of insertion of the shell 23 and the carrier 24 during the assembly period.

Figure 3:
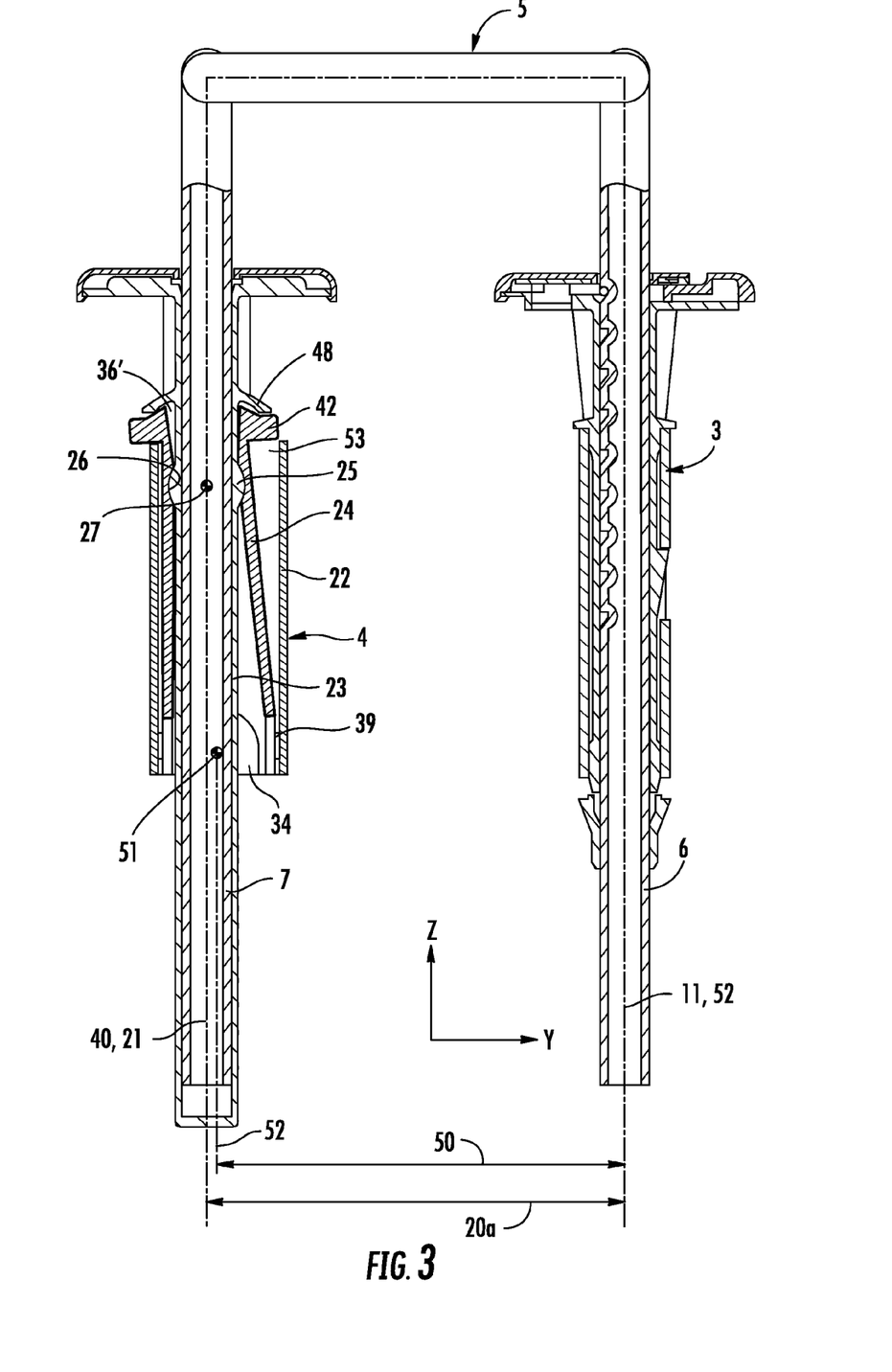

The two holders, namely 3 and 4, are placed on the framing 2 of the seat at a separating distance 50, length of which is determined by the extension of the headrest yoke 5. A headrest yoke 5 with a specified extension can be inserted into the receiving holders 3, 4, without any necessity for the shell 23 and the carrier 24 to change their positions. In the situation shown in FIGS. 1 and 7, the shell 23 and the carrier 24 are practically coaxially aligned with the central axis 52 of the protective encasement 22.

Where FIG. 3 is concerned, the width of the headrest yoke 5, that is, the separating distance 20a between the central, longitudinal axis 11, 21 of the rods 6, 7, is greater than the separating distance 50 between the respective central axes 52 of the protective encasements 10 and 22. Obviously, consideration can also be given to a situation, wherein the separating distance of the holders 3, 4 deviate from a specified value. For clarification, in the following, an explanatory discussion will be carried out in regard to holders 3 and 4 which are correctly separated and aligned parallel to one another.

Figure 4:
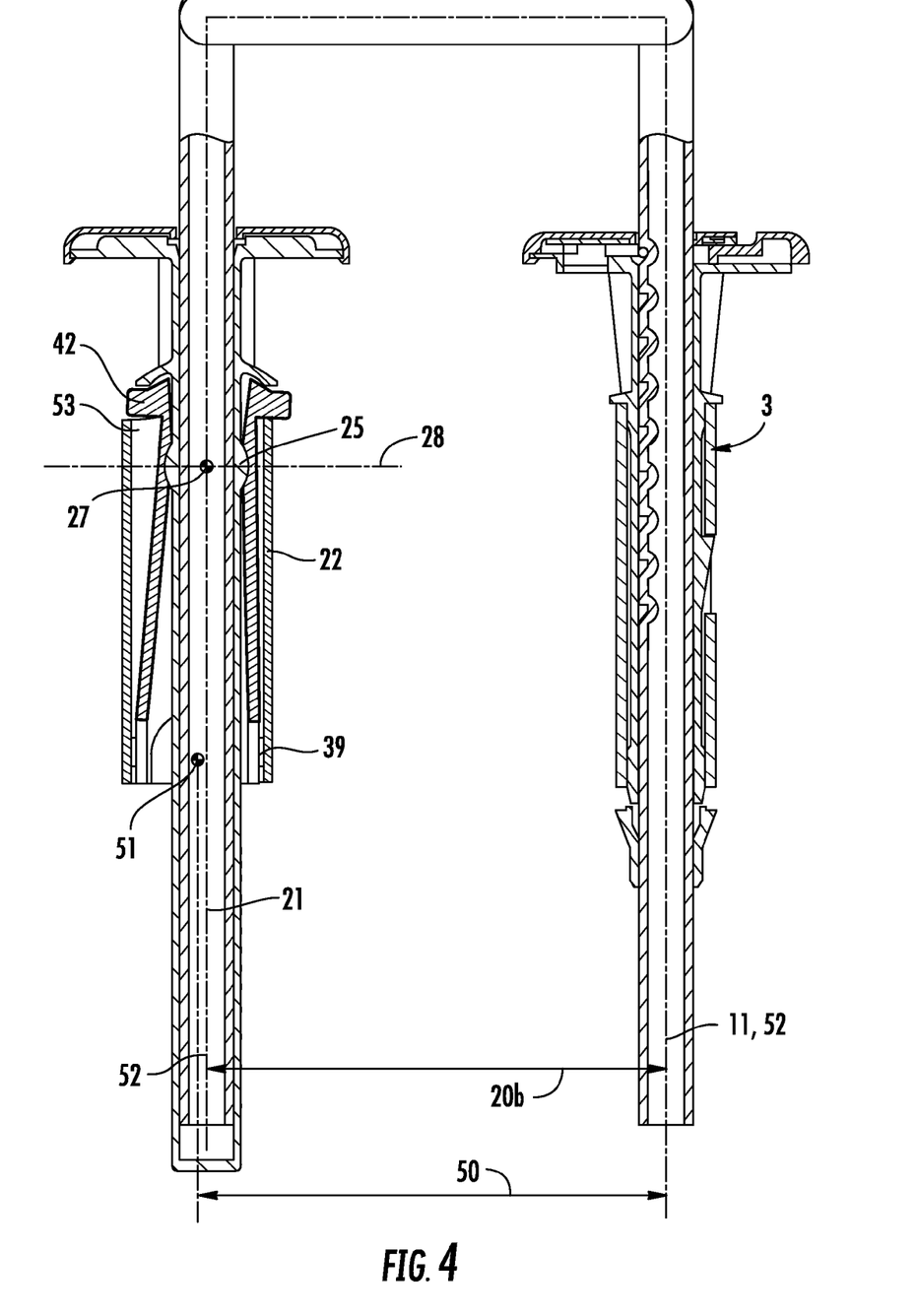

By means of a pivotal motion of the carrier 24 about the third axis 51, the central axis of the shell 23, which is identical to the axis 21 of the rod 7, is displaced parallel to the Y-direction into a position which corresponds to a separating distance 20a. A similar situation is presented in FIG. 4, only in this case, the central axis separating distance 20b is smaller than the central axis separating distance 50 between the protective encasements 10, 22. A compensation, or matching of the altered extension of the headrest yoke 5 is effected, in turn, by a pivoting of the carrier 24 about the third axis 51 in the Y-direction, only this time, in a reversed direction to that of the case of FIG. 3. In both cases, the carrier 24 and the shell 23 carry out a swinging motion about the first axis 27. Mention must be made, that in spite of the said swinging motion of the carrier 24 in its two end bearings, the flange 42 retains its position in keeping the upper opening 53 of the protective encasement covered. The said opening 36' between the carrier 24 and the shell 23, as well as the slot 45' (FIG. 9), in any pivoted position, are likewise covered by the said flange 48. An infiltration of foreign bodies into the pivot zone of the shell 23 and the carrier 24 is thereby prevented.

Figure 5:
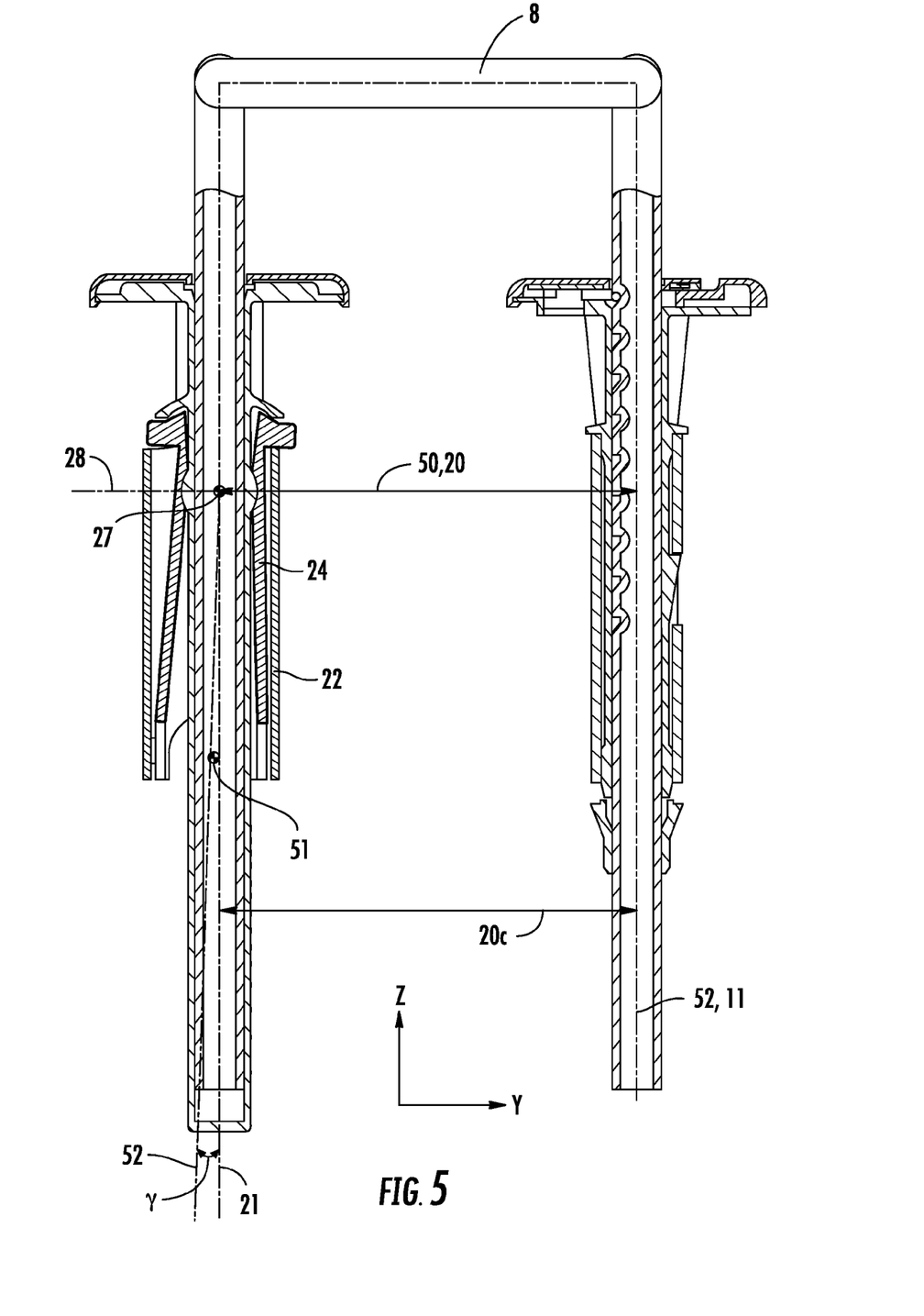

In the case of the example in accord with FIG. 5, the rods 6, 7 in the YZ plane do not run parallel, but rather converge toward one another at their free ends. In accord therewith, in the zone of the free ends, the separation distance 20c is smaller than the specified separation distance 20. The inclined position of the rod 7 can be compensated by an appropriate pivoting of the shell 23 about the first axis 27. The angle γ, of the therewith fully completed swinging motion corresponds to the inclined positioning of the rod 7. Corresponding relationships naturally appear, if only the rod 6, or if both rods 6, 7 depart from their specified alignments.

Figure 6:
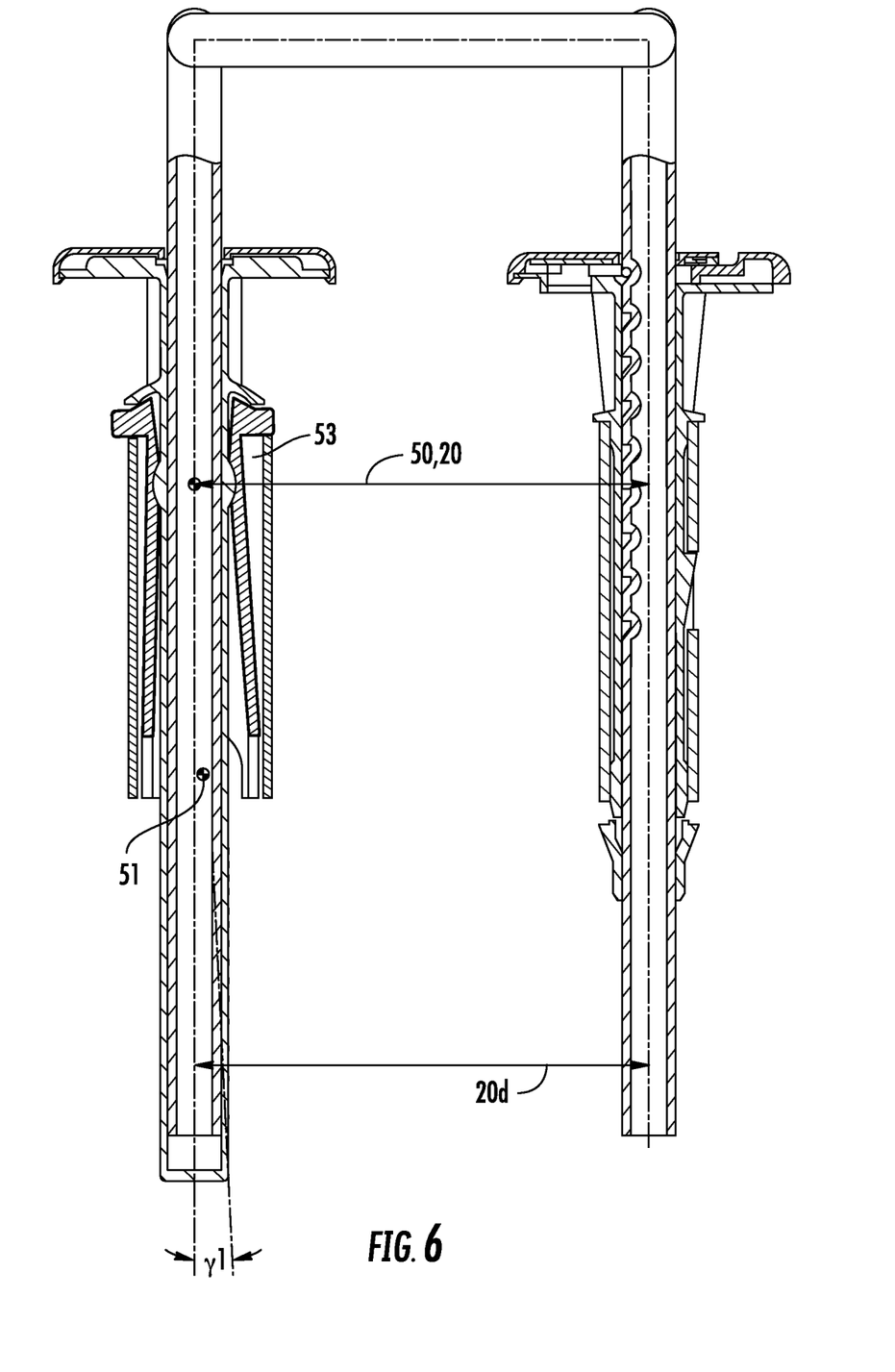

In FIG. 6, a similar situation is shown, wherein the two rods 6, 7 diverge from one another at their free ends, so that, in this case, the central axis separating distance 20d is greater than the specified separation distance 20. The pivoting of the shell 23 relative to the carrier 24 is done here, contrarily to the action of FIG. 5, in that the angle γ is executed in the opposite direction, whereby it corresponds to the inclined position of the rod 7.

Figure 8:
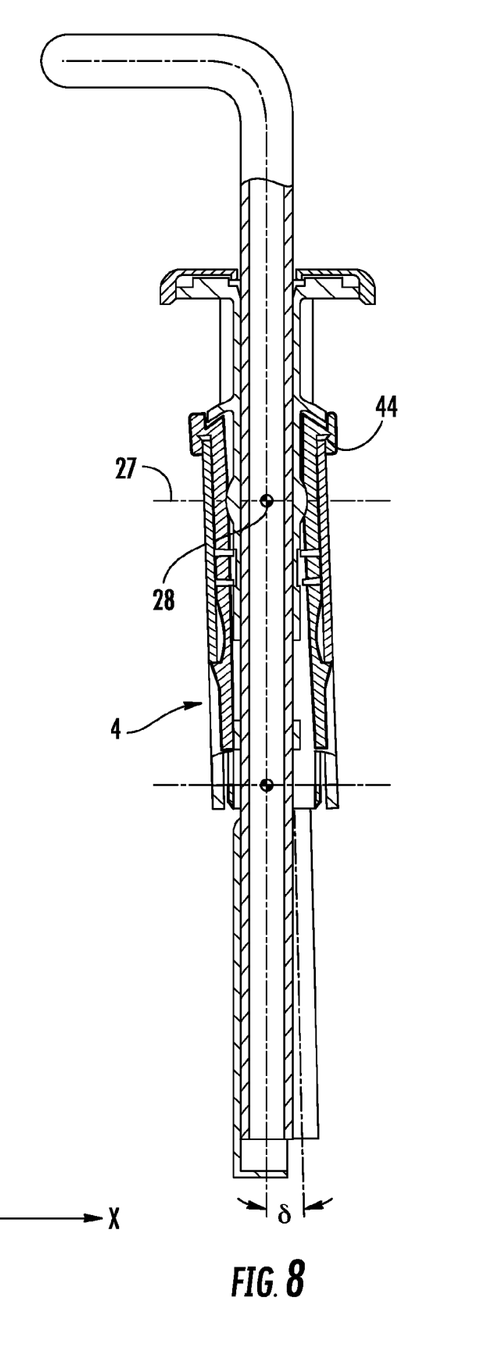

FIG. 8 shows a situation, in which the two rods are transposed into the XZ plane. Here, the rod 7 is rotated through an angle δ in relation to the rod 6. A compensation of this inclination is done by a pivot motion of the shell 23 about the second axis 28, which axis extends itself in the Y-direction. A pivoting motion of the carrier 24, i.e., a movement in the X-direction, is not required in this case, since, upon the insertion of the rod 7 into the holder 4, an insignificant, motion component is generated in the X-direction, causing a non-disturbing twist of the headrest about the rod 6, which serves as a turning axle therefor.

Figure 9:
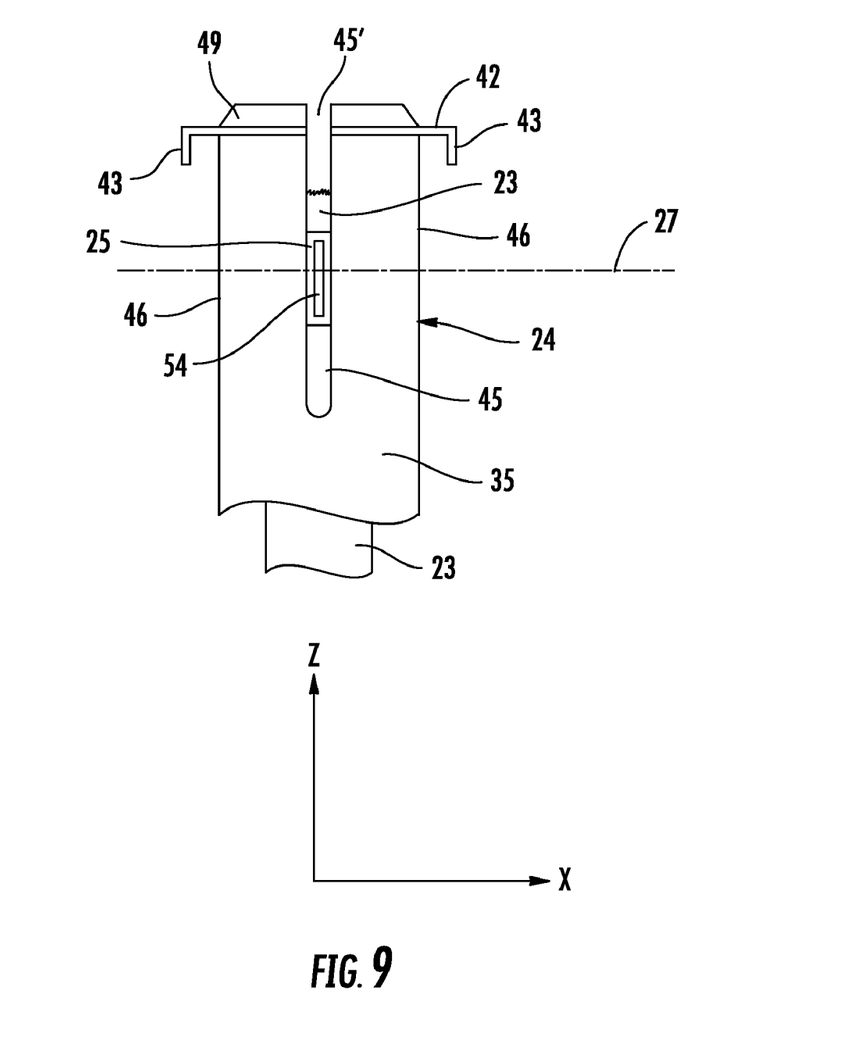

The above described method of operation of the fastening device is independent thereof, as to whether or not the shell 23 can rotate about its central axis 40. A fixation against such rotation can be considered, if, on the upper end of the part assigned to the shell 23 an oval cover plate 17 is placed to absorb a predetermined positional rotation in relation to the back of the seat. For the rotation blockage, radial detents, extending outward from the surface of the ring projection 25 are present and extend themselves, respectively, into a recess of the carrier 24. When this occurs, between the said detent and the recess exists a clearance in the directions X, Y, and Z, in order that an unrestricted pivoting of the shell 23 may be made possible. As a recess, the existing slot 45 can be used The detents are in the form of axially extending ribs 54 as shown in FIG. 9. Since the slot 45 is aligned in the Z-direction and runs in the YZ-plane, then a pivoting of the shell 23 about the first axis 27, which runs in the X-direction, becomes possible. The ribs 54 and the slot 45 are, further, so dimensioned, that in the case of a pivoting of the shell 23 about the second axis, which runs in the Y-direction, sufficient clearance is allowed.

REFERENCE NUMBERS AND
CORRESPONDING COMPONENTS

1 Vehicle seat
2 Seat frame
3 Holder
4 Holder
5 Headrest yoke
6 Rod
7 Rod
8 A part, i.e. cross-bar for 5
9 Guide shell
10 Protective encasement
11 Centerline axis of 6
12 Longitudinal section
13 Projection
14 Window
15 Flange
16 Upper, reclining seat back
17 Cover plate
18 Frictional element
19 Notch
20 Separating space
20d
21 Centerline axis of 7
22 Protective encasement
23 Guide shell
24 Carrier element
25 Ring projection
26 Recess (FIG. 2)
27 First axis
28 Second axis
29 Projection
30 Window
31 Under edge
32 Window
33 Web
34 Recess on 24
35 Wall on 24
36 Separating distance
36' Separating distance
37 Wall section
38 Wall of 32
39 Opening fissure
39' Opening fissure
40 Centerline axis of 23
42 Flange
43 Rim
44 Opening fissure
45 Slot
45' Slot
46 Wall (of 24 in "x" direction)
47 Projection
48 Flange
49 Dome
50 Separating distance
51 Third axis
52 Center longitudinal axis
53 Opening
54 Rib

The invention claimed is:

1. A fastening device for a headrest of a vehicle seat having a framing, the device comprising:
two support rods for attachment to the headrest;
two holders attached to the framing of the seat distanced from one another in a direction (Y) transverse to the seat for adjustable guidance of the height of the two support rods, each of the support rods slidable within a respective one of the holders;
one of the holders having a guide shell which can accommodate one of the support rods via slidable encasement; and
a carrier mounted to the one of the holders and being movable in a direction transverse to the seat (Y), the guide shell being movably mounted to the carrier so that the guide shell pivots relative to the carrier around a first axis which runs in the longitudinal direction of the seat (X), the height of the support rods relative to the seat being adjustable by sliding the support rods within the holders, whereby minor misalignment between the support rods can be compensated for via pivoting of the guide shell relative to the carrier about the first axis.

2. A fastening device in accord with claim 1, wherein the guide shell pivots relative to the carrier about a second axis which runs in a transverse direction (Y) to the seat.

3. A fastening device in accord with claim 1, wherein the carrier pivots about a third axis distanced in the seat height direction (Z) from the first axis and running parallel thereto.

4. A fastening device in accord with claim 3, wherein the third axis is positioned underneath the first axis.

5. A fastening device in accord with claim 4, wherein a section of the carrier above the third axis is fixed relative to the seat framing in the longitudinal direction (X) of the seat and is movable in a transverse direction (Y) relative to the seat.

6. A fastening device in accord with claim 4, wherein the third axis is defined by two projections located on the seat framing.

7. A fastening device in accord with claim 1, wherein the guide shell, via a ring projection protruding from its outer side, linkedly engages in a complementarily shaped recess on the carrier, whereby the surface of the ring projection as well as the coacting surface of the recess are both portions of a spherical surface, the center-point of which is also the point of intersection for the first and second axes.

8. A fastening device in accord with claim 1, wherein the guide shell is supported on a counter surface on an upper end of the carrier via a coacting surface flange projecting from an outside of the guide shell.

9. A fastening device in accord with claim 8, wherein respective coacting surfaces of the flange and the carrier are portions of spherical surfaces, the center point of which is the point of intersection of the first and second axes.

10. A fastening device in accord with claim 1, wherein the carrier is a hollow structural member, which is penetrated by the guide shell, which, in turn, is within a protective encasement affixed to the seat framing, wherein clearance is allowed in the transverse direction (Y) of the seat between the guide shell and the carrier.

11. A fastening device in accord with claim 10, wherein walls of the carrier which face in the transverse direction (Y) of the seat, diverge in the direction of a lower end of the walls.

12. A fastening device in accord with claim 1, wherein the guide shell is nonrotatably affixed in relation to central axis of the guide shell.

13. A fastening device in accord with claim 12, wherein a ring projection of the guide shell includes a radially extending detent located in a complimentary recess on the carrier with clearances in the (X), (Y), and (Z) directions.

14. A fastening device in accord with claim 13, wherein a further recess is formed by a slot in a Y-direction facing wall of the carrier, the recess extending upward from an area of the complimentary recess of the carrier and opens in an upper end-face of the carrier.

* * * * *

UNITED STATES PATENT AND TRADEMARK OFFICE
CERTIFICATE OF CORRECTION

| | | |
|---|---|---|
| PATENT NO. | : 7,600,818 B2 | Page 1 of 1 |
| APPLICATION NO. | : 10/528958 | |
| DATED | : October 13, 2009 | |
| INVENTOR(S) | : Ebbeskotte et al. | |

It is certified that error appears in the above-identified patent and that said Letters Patent is hereby corrected as shown below:

On the Title page of the patent, Section 22, please change date from July 27, 2004 to January 12, 2004

Signed and Sealed this

Fifteenth Day of June, 2010

David J. Kappos
*Director of the United States Patent and Trademark Office*

UNITED STATES PATENT AND TRADEMARK OFFICE
CERTIFICATE OF CORRECTION

PATENT NO.      : 7,600,818 B2
APPLICATION NO. : 10/528958
DATED           : October 13, 2009
INVENTOR(S)     : Ebbeskotte et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 31 days.

Signed and Sealed this

Fifth Day of October, 2010

David J. Kappos
*Director of the United States Patent and Trademark Office*